United States Patent [19]
Rose

[11] Patent Number: 5,692,338
[45] Date of Patent: Dec. 2, 1997

[54] WATER SPIKE

[76] Inventor: Andrew D. Rose, 5336 N. 33rd. St., Phoenix, Ariz. 85018

[21] Appl. No.: 594,346

[22] Filed: Jan. 30, 1996

[51] Int. Cl.$^6$ ............................................... A01G 29/00
[52] U.S. Cl. ............................................... 47/48.5; 172/22
[58] Field of Search ............................ 47/48.5 G, 1.01, 47/48.5 M, 48.5 R; 172/21, 22

[56] References Cited

U.S. PATENT DOCUMENTS

| | | |
|---|---|---|
| 1,791,873 | 2/1931 | Neiman ............................ 47/48.5 G |
| 2,145,934 | 2/1939 | Kingman .......................... 47/48.5 M |
| 3,151,415 | 10/1964 | James . |
| 4,866,880 | 9/1989 | Weinblatt . |
| 5,259,142 | 11/1993 | Sax . |

FOREIGN PATENT DOCUMENTS

| | | | |
|---|---|---|---|
| 126574 | 11/1984 | European Pat. Off. ............ 47/48.5 G |
| 1104205 | 11/1955 | France ................................. 47/48.5 G |
| 2642624 | 3/1978 | Germany ............................ 47/48.5 G |
| 191175 | 8/1937 | Switzerland ........................ 47/48.5 G |
| 453429 | 9/1936 | United Kingdom ................ 47/48.5 G |

Primary Examiner—Henry E. Raduazo
Attorney, Agent, or Firm—Franklin Gubernick

[57] ABSTRACT

A watering system composed of a number of cone-shaped spikes. An inserter spike having imperforate sidewalls is used to initially create a hole in a region of soil near a plant. The inserter spike is then removed from the hole and is placed within a perforated watering spike that is complementary in shape to the inserter spike. The combined unit is then placed in the hole whereby the inserter spike prevents soil from entering the interior area of the watering spike. Once the watering spike is properly positioned, the inserter spike is removed from the interior of the watering spike. Water can then be entered into the interior of the watering spike via a large opening at the top of the watering spike. The water then enters the soil in a dispersed and controlled manner via the perforations in the watering spike.

18 Claims, 2 Drawing Sheets

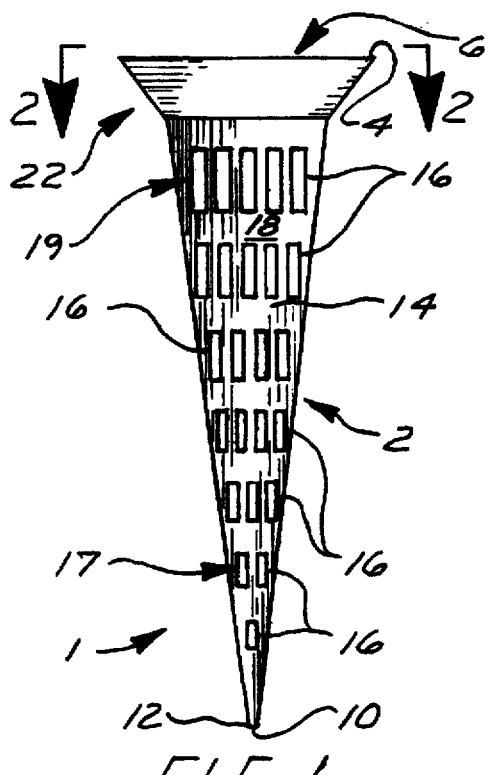
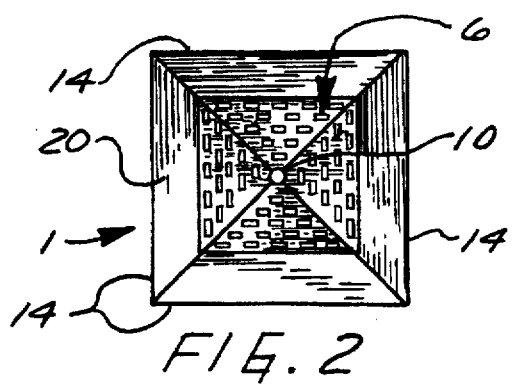
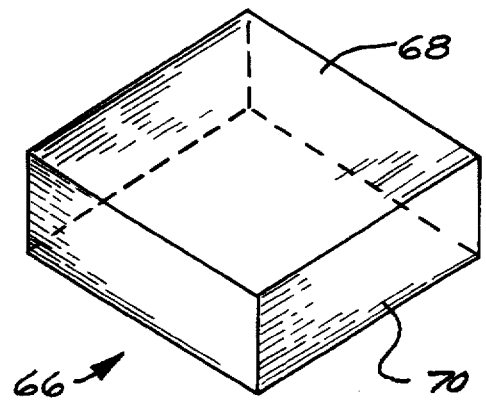
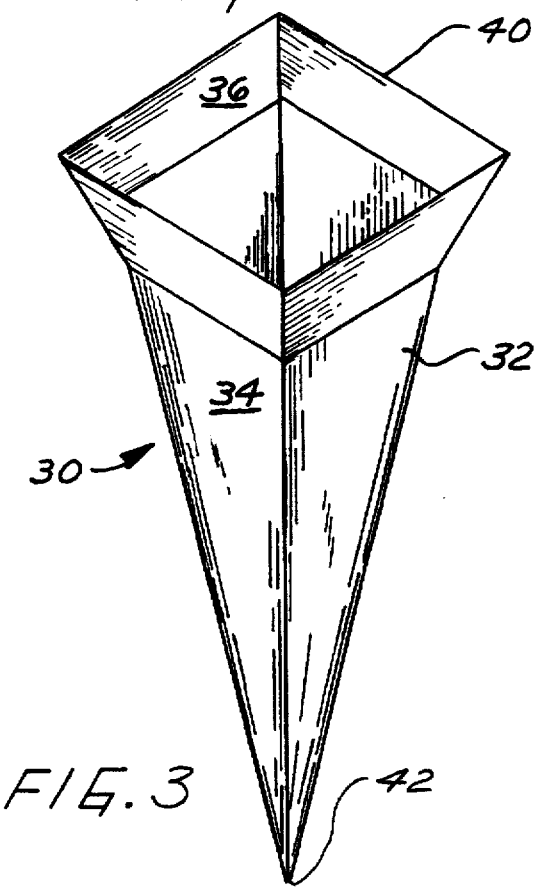
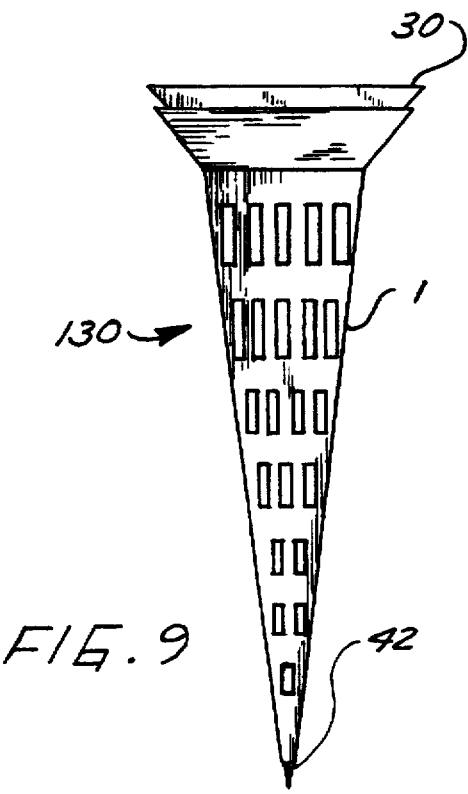

WATER SPIKE

FIELD OF THE INVENTION

The invention is in the field of horticultural devices. More particularly, the invention is an apparatus designed to facilitate the watering of plants. The apparatus includes a plurality of spikes that are complementary to each other in shape. In the preferred embodiment, one of the spikes has solid, imperforate sides and another of the spikes has perforated sides. The solid spike is used to initially create a hole in the soil adjacent a plant and later is used to facilitate insertion of the perforated spike into said hole.

BACKGROUND OF THE INVENTION

When watering a plant, a primary goal is to fully saturate the soil in the area of the plant's roots. When dealing with loose soil in a natural setting, water that impacts on the surface of the soil or is continually in contact with a side portion of the soil will naturally seep through the soil in a dispersed manner to thereby come into contact with the plant's roots. This is an ideal situation that is not easily replicated in man-made settings such as when a plant is located in a pot or in a landscaped area.

A common problem with man-made plant environments is that water poured onto the soil's surface is not evenly dispersed as it travels downwardly through the lower layers of the soil. In potted plants, the water will usually spreads over the soil's surface before it travels downwards through the soil. As the water spreads outwardly, it contacts the sidewall of the pot and/or previously formed flow channels in the soil. The water will then follow these existing paths of low resistance and rapidly travel to the bottom of the pot without fully saturating all of the soil in the pot. A similar mechanism may occur in landscaped areas where water will be routed away from the plant by hydrologic causes or by imperfections in the soil's consistency. In this manner, only small portions of the plant's roots may come into contact with the water. This effectively defeats the goal of providing ample water for the plant(s).

Another problem that arises when one is watering a plant occurs when the water seeps through the soil too quickly to provide sufficient water for the plant's roots. Overcoming this problem often requires a person to provide a plant with water over a prolonged period of time. This may require the person to expend significant time and/or effort to accomplish proper watering of the plant.

In attempting to solve the above-noted problems, the prior art teaches a number of watering devices. In particular, there are a number of taught devices in which a tubular member having perforated sidewalls is inserted into the ground proximate the plant. To water the plant, a person pours water into the top of the member. The water then exits from the sidewalls of the member and is thereby dispensed into the soil. These devices are typically quite complicated, require tight tolerances and/or are expensive to manufacture. In addition, some of the devices over-aerate the soil whereby the soil can become prematurely dried out.

SUMMARY OF THE INVENTION

The invention is a watering system that mitigates or avoids the above-noted problems. The system makes use of one or more cone-shaped, apertured members designed for placement in an area of soil adjacent a plant. Insertion of an apertured member is facilitated through the use of a cone-shaped inserter member. The inserter member has exterior dimensions substantially identical to those of the apertured member.

The inserter member is initially employed to create a cone-shaped hole in the soil in an advantageous location proximate the plant. The member is then placed into the interior of the apertured member whereby the exterior surface of the inserter member blocks the interior openings of the holes in the apertured member. A person can then insert the combined unit into the newly created hole without the soil entering the interior of the apertured member. It should be noted that since the exterior shape of the inserter member is substantially identical to that of the apertured member, the hole created by the inserter member will have a shape that is substantially identical to that of the apertured member. As a result, the apertured member will fit snugly into the hole with its outer surface fully contacting the soil.

Once the apertured member is seated within the hole, the inserter member is withdrawn. A person can then pour water directly into the apertured member via a large opening located in the top of the member. The member's side-located apertures enable the water to then slowly and steadily drain from the member into the soil. This causes the water to enter the soil in a dispersed, controlled and effective manner. To prevent premature drying of the soil, an optional cap may be employed to close the member's top-located opening.

BRIEF DESCRIPTION OF THE DRAWINGS

FIG. 1 is an elevational view of a watering spike in accordance with the invention.

FIG. 2 is a plan view of the spike shown in FIG. 1.

FIG. 3 is a side, perspective view of an inserter spike in accordance with the invention.

FIG. 9 is an elevational view showing the inserter spike placed within the watering spike.

FIG. 10 is a perspective view of a cap for the watering spike shown in FIG. 1.

DETAILED DESCRIPTION OF THE DRAWINGS

Figure 4:
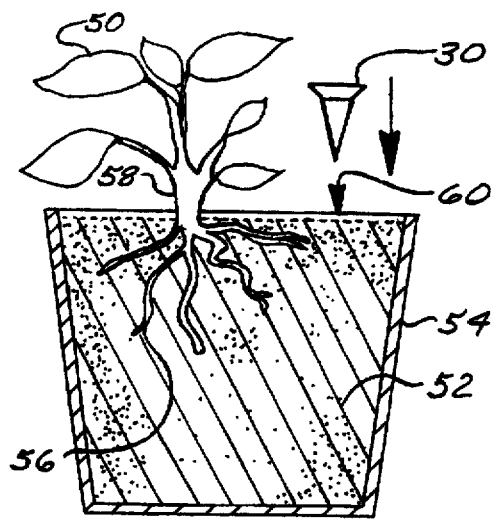
FIGS. 4–8 provide sequential side views portraying the installation of a watering spike in accordance with FIG. 1 proximate a plant. The figures also detail the manner in which the inserter spike shown in FIG. 3 is employed.

Referring now to the drawings in greater detail, wherein like characters refer to like parts throughout the several figures, there is shown by the numeral 1 a watering spike in accordance with the invention.

The spike 1 is a substantially cone-shaped member that has a body portion 2 having an open interior area. The top, wide end 4 of the spike defines the perimeter of a large opening 6 that provides easy access to the spike's open interior area. The interior area of the spike is also accessible via a small opening 10 located in the bottom, narrow end 12 of the spike. In the preferred embodiment, the body 2 is formed from a plurality of contiguously-joined thin walls/sidewalls 14 that are each in the form of a planar member. In this manner, the body portion resembles an inverted four-sided pyramid and has horizontally-oriented cross-sections that are square in shape. The walls/sidewalls 14 are preferably fabricated from a rigid or semi-rigid plastic or cardboard material that has a thickness of approximately one-eighth to one-sixteenth of an inch.

It should be noted that other tapered shapes may be employed for the body 2. For example, the body may be a circular cone in which a circular sidewall forms the body and each horizontally-oriented cross-section of the body is circular in shape.

In the preferred embodiment, the spike 1 has a length of approximately three to twelve inches and a diameter of from one to five inches. In a typical embodiment, the spike has an overall length of 5.5 inches and its diameter decreases from 2 inches at its top end 4 to less then ¼ inch at its bottom end 12.

Each wall 14 of the spike's body includes a plurality of spaced apertures 16. Every aperture extends from the spike's exterior surface 18 to its interior surface 20. The apertures provide a direct path through the body of the spike. As shown, the apertures are spaced apart from each other and are located in vertically-spaced rows with each row having a greater number of apertures than the row beneath it.

In the preferred embodiment, there are a greater number of apertures in the top half of the spike than there are in the bottom half of the spike. As also shown and is preferred, the size of the apertures 16 increases from the bottom to the top of the spike. For example, each of the apertures in row 17 are approximately one-sixteenth of an inch wide by one-quarter of an inch wide. As one progresses upwards, the aperture dimensions increase incrementally until, by row 19, each aperture is approximately ⅛ inch wide by ½ inch high. In this manner, the cumulative area of the apertures at each vertically-spaced level of the body increases from the bottom to the top of the body. When the spike is filled with water, the large area of the apertures near the top of the body helps to compensate for the increased fluid head on the liquid near the bottom of the body. As a result, the drainage pattern will achieve a uniform or slightly top-heavy dispersal of water into the soil. This prevents the water from bypassing the upper portion of a plant's root system. Therefore, the aperture pattern shown in the drawings facilitates drainage from the spike in a desired manner. It should be noted that the bottom-located opening 10 enables full drainage of the spike so that water or other matter does not stay within the interior area of the body for an extended period of time.

As can also be seen in FIG. 1, the extreme top portion 22 of the spike flares outwardly and does not include any perforations. This portion acts as a funnel to facilitate the entry of water into the interior area of the spike. Portion 22 also helps to maintain the position of the spike once the spike has been inserted into an area of soil proximate a plant.

FIG. 3 provides a detailed side, perspective view of an inserter spike 30 in accordance with the invention. The inserter spike is preferably hollow and has exterior dimensions that are substantially identical to those of spike 1. The spike's body portion 32 is tapered in the same manner as that of spike 1 with inner and outer surfaces, 34 and 36 respectively, that match the contours of the inner and outer surfaces of spike 1. The top end 40 of the spike is completely open while the spike's bottom end 42 is closed. The material of the inserter spike is preferably rigid and durable. In the preferred embodiment, the inserter spike is made of either a hard plastic or metal material.

It should be noted that as an alternate embodiment, the spike 30 can be a solid member in lieu of a hollow member. However, by employing a spike 30 that is hollow, the spike can be used to inwardly receive the more fragile spike(s) 1 and thereby protect said spike(s) during transport and/or storage.

FIGS. 4-8 are side, cross-sectional views of a plant 50 surrounded by soil 52. As shown, the soil is located within a pot 54. The soil could alternatively be located in a landscaped area. The plant's roots 56 extend downwardly into the soil and spread out in a direction away from a longitudinal axis defined by the plant's vertically-oriented stem 58. To effectively provide water to the plant's roots, it is desirable to saturate the surrounding soil with water. FIGS. 4-8 provide a sequential depiction of the insertion of a watering spike 1 into the soil 52 to enable the desired soil saturation.

In FIG. 4, a desirable location for the placement of the spike 1 is labeled 60. The inserter spike 30 is shown located above said location.

Figure 5:
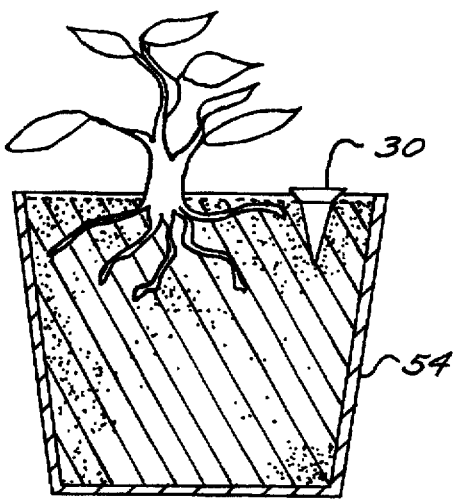

FIG. 5 shows the inserter spike 30 fully inserted into the soil at location 60. This would normally be accomplished by a user pressing downwardly on the top end 40 of the spike and thereby forcing the spike's pointed bottom end 42 into the soil. In the preferred embodiment, the rigid material of the spike will allow for its insertion with the aid of a tool such as a lightweight hammer. The spike's insertion will inherently create a hole in the soil that has interior dimensions that are substantially identical to the exterior dimensions of the spike 30.

Figure 6:
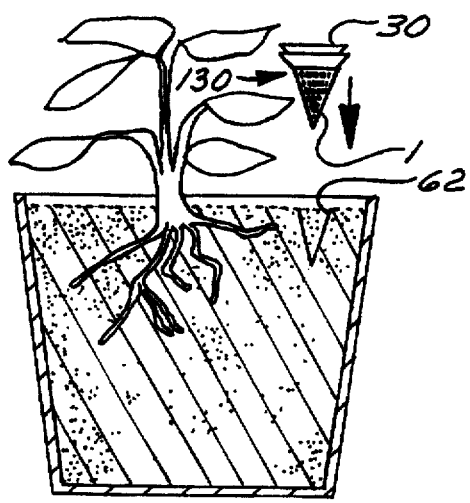

FIG. 6 shows the spike 30 removed from the soil and the cone-shaped hole 62 that was created by the spike's insertion. It should be noted that since the exteriors of spikes 1 and 30 are substantially identical in shape, hole 62 will have a size and shape that is substantially identical to the exterior of the spike 1.

Also portrayed in FIG. 6 is the insertion of spike 30 into the open interior area of spike 1. This step creates a combined spike unit 130 (note FIG. 9) in which the inserter spike 30 is at least partially housed within the apertured spike 1.

Figure 7:
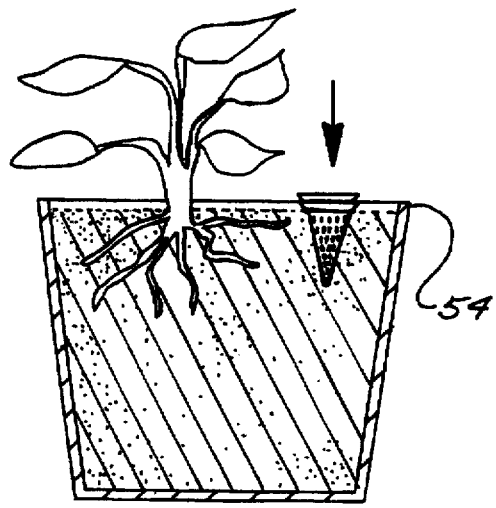

FIG. 7 shows the combination spike unit 130 inserted into the hole 62. A person will normally apply pressure to the top end of the inserter spike to push spike 1 into the hole. This causes spike 1 to become firmly lodged in the soil. It should be noted that since the exterior surface of spike 30 matches the interior surface of spike 1, the exterior surface of spike 30 will contact and be flush with the interior surface of spike 1. In this manner, the exterior surface of spike 30 will block the interior opening of each of the apertures 16 and the bottom opening 8 and thereby prevent dirt from entering the interior area of spike 1. As can be seen in FIG. 9, the bottom point of spike 30 may extend through the bottom opening 10 in spike 1.

Figure 8:
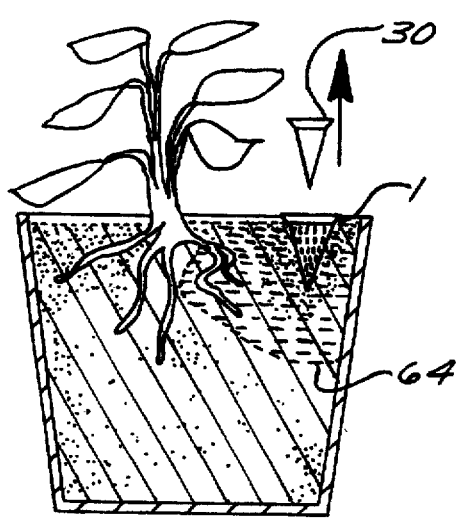

FIG. 8 shows the removal of spike 30 from the interior of spike 1. Once spike 1 has been positioned as shown, water can be entered into its interior area via the spike's top opening 6. The water will then enter the soil as it drains from the spike's interior area via the apertures 16 and bottom opening 8. An example of a water dispersal pattern that may result as water drains from the spike is shown by the shaded area 64 in the figure.

FIG. 10 shows an optional cap 66 that can be secured to the top of spike 1 (or spike 30). The cap includes a flat top portion 68 and four side portions 70 that are oriented perpendicular to the top portion. The distance between opposite sides portions 70 of the cap is equal to the diameter of the top edge of the spike 1. This enables the cap to be placed onto the top of the spike whereupon the side portions 70 of the cap secure it to the top edge of the spike. When the cap is in place on the top of spike 1, it functions to seal opening 6 and thereby prevent moisture from escaping from the interior of the spike via the top opening. This avoids the problem of premature drying of the soil that may occur as air from the lower soil layers enters the interior of the spike via its side and bottom apertures and is then able to easily escape via the spike's top opening.

While the insertion of a single spike 1 has been shown and described in the figures, it should be noted that a user will typically install multiple spikes 1 in a spaced pattern about a single plant. The installation of each spike 1 would be accomplished using the previously described method. Even when multiple spikes 1 are installed, only a single inserter spike 30 is required to accomplish all of the installations.

The preferred embodiment of the invention disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A plant watering system, said system comprising:
   a first cone-shaped member having a top end portion that includes an opening, a bottom end portion and a continuously tapered body portion that extends from said top end portion to said bottom end portion, wherein said top end portion is wider than said bottom end portion and wherein said body portion is defined by a wall that surrounds an open interior area and wherein said wall includes a plurality of apertures that extend completely through said wall;
   a second cone-shaped member having a top end that includes an opening, a bottom end, and a tapered body portion located between said top and bottom ends and wherein said top end is wider than said bottom end and wherein said body portion has an imperforate outer wall that surrounds an open interior area; and
   wherein the body portion of the second cone-shaped member is complementary in shape to both an inner and outer surface of the body portion of the first cone-shaped member and can inwardly receive within its open interior area a major portion of the first cone-shaped member.

2. The system of claim 1 wherein the first cone-shaped member includes a center-located opening in its bottom end portion.

3. The system of claim 1 wherein the outer wall of the second cone-shaped member has a smooth, uniform exterior surface and wherein said second cone-shaped member can be placed substantially within the first cone-shaped member without having any portion of said second cone-shaped member extending into any of said apertures in the wall of the first cone-shaped member.

4. The system of claim 1 wherein the first cone-shaped member includes a plurality of apertures of a first size and a plurality of apertures that are smaller than the apertures of said first size.

5. The system of claim 1 wherein each of the apertures of the first cone-shaped member has an opening of a predetermined area, wherein a top half of the first cone-shaped member has a first drain area, wherein said first drain area is a cumulative sum total of the opening area of all of the apertures in said top half and wherein a bottom half of the first cone-shaped member has a second drain area, wherein said second drain area is a cumulative sum total of the opening area of all of the apertures located in said bottom half and wherein the first drain area is greater than the second drain area.

6. The system of claim 1 wherein the first and second cone-shaped members are substantially equal in length and wherein said second cone-shaped member can be placed within said first cone-shaped member to form a combined unit in which the top end of the second cone-shaped member defines the top end of the unit.

7. The system of claim 1 further including a third cone-shaped member, wherein said third cone-shaped member is substantially identical to the first cone-shaped member and wherein said second cone-shaped member can be employed to insert the first cone-shaped member into an area of soil proximate a plant and then used to insert the third cone-shaped member into said area of soil at a location spaced-apart from said first cone-shaped member.

8. The system of claim 1 wherein the top end portion of the first cone-shaped member is outwardly flared.

9. The system of claim 1 wherein the wall of the first cone-shaped member is formed from a plurality of flat portions that are joined at edges thereof.

10. The system of claim 9 wherein the first cone-shaped member is in the form of an inverted pyramid.

11. A plant watering system, said system comprising:
    a first cone-shaped member having a top end that includes an opening, a bottom end and a body portion located between said top and bottom ends, wherein said top end is wider than said bottom end and wherein said body portion is defined by a wall that surrounds an open interior area and wherein said wall includes a plurality of apertures that extend completely through said wall;
    a second cone-shaped member having a top end, a bottom end, and a body portion located between said top and bottom ends and wherein said top end is wider than said bottom end and said body portion includes imperforate sidewalls; and
    wherein the body portion of the second cone-shaped member is complementary in shape to both an inner and outer surface of the body portion of the first cone-shaped member and can fit within the open interior area of said first cone-shaped member in a manner wherein the exterior surface of the portion of the second cone-shaped member that is within the first cone-shaped member will be located flush with an interior surface of the first cone-shaped member and thereby block the apertures in the first cone-shaped member without extending into said apertures.

12. The system of claim 11 wherein the first cone-shaped member includes an opening in its bottom end and wherein when the second cone-shaped member is placed within the first cone-shaped member, a bottom tip portion of the second cone-shaped member will block the opening in the bottom end of the first cone-shaped member.

13. The system of claim 11 wherein the first cone-shaped member includes a plurality of apertures of a first size and a plurality of apertures that are smaller than the apertures of said first size.

14. The system of claim 11 wherein each of the apertures of the first cone-shaped member has an opening of a predetermined area, wherein a top half of the first cone-shaped member has a first drain area, wherein said first drain area is a cumulative sum total of the opening area of all of the apertures in said top half and wherein a bottom half of the first cone-shaped member has a second drain area, wherein said second drain area is a cumulative sum total of the opening area of all of the apertures located in said bottom half and wherein the first drain area is greater than the second drain area.

15. The system of claim 11 further including a third cone-shaped member, wherein said third cone-shaped member is substantially identical to the first cone-shaped member and wherein said second cone-shaped member can be employed to insert the first cone-shaped member into an area of soil proximate a plant and then used to insert the third cone-shaped member into said area of soil at a location spaced-apart from said first cone-shaped member.

16. The system of claim 11 wherein the wall of the first cone-shaped member is formed from a plurality of flat portions that are joined at side edges thereof.

17. The system of claim 16 wherein the first cone-shaped member is in the form of an inverted pyramid.

18. A plant watering system, said system comprising:

a first cone-shaped member having a top end portion that includes an opening, a bottom end portion and a continuously tapered body portion that extends from said top end portion to said bottom end portion, wherein said top end portion is wider than said bottom end portion and wherein said body portion is defined by a wall that surrounds an open interior area and wherein said wall includes a plurality of apertures that extend completely through said wall;

a second cone-shaped member having a top end, a bottom end, and a tapered body portion that extends from said top end to said bottom end and wherein said top end is wider than said bottom end; and wherein the body portion of the second cone-shaped member has an outer surface that is complementary in shape to an inner surface of the body portion of the first cone-shaped member, wherein the first and second cone-shaped members are substantially equal in length, and wherein said second cone-shaped member can be placed within said first cone-shaped member to form a combined unit in which the top end of the second cone-shaped member defines the top end of said combined unit.

\* \* \* \* \*